US008823297B2

(12) United States Patent
Kermarrec et al.

(10) Patent No.: US 8,823,297 B2
(45) Date of Patent: Sep. 2, 2014

(54) METHOD OF CONTROL IMPLEMENTED IN A VARIABLE SPEED DRIVE FOR CONTROLLING THE DECELERATION OF AN ELECTRIC MOTOR IN THE CASE OF POWER OUTAGE

(75) Inventors: Ludovic Kermarrec, Evreux (FR); Francois Malrait, Jouy sur Eure (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 237 days.

(21) Appl. No.: 13/529,250

(22) Filed: Jun. 21, 2012

(65) Prior Publication Data

US 2013/0015790 A1 Jan. 17, 2013

(30) Foreign Application Priority Data

Jul. 12, 2011 (FR) ...................................... 11 56347

(51) Int. Cl.
*H02K 15/03* (2006.01)
*H02K 19/10* (2006.01)
*H02P 21/14* (2006.01)

(52) U.S. Cl.
USPC ............ 318/364; 318/812; 318/461; 318/519

(58) Field of Classification Search
CPC .......................... H02P 21/0092; H02P 29/025
USPC .................................. 318/364, 812, 461, 519
See application file for complete search history.

(56) References Cited

U.S. PATENT DOCUMENTS

| 4,023,083 | A | * | 5/1977 | Plunkett | 318/802 |
| 5,149,998 | A | * | 9/1992 | Wolcott | 310/105 |
| 5,334,923 | A | * | 8/1994 | Lorenz et al. | 318/805 |
| 5,565,752 | A | * | 10/1996 | Jansen et al. | 318/807 |
| 5,585,709 | A | * | 12/1996 | Jansen et al. | 318/807 |
| 5,990,657 | A | * | 11/1999 | Masaki et al. | 318/811 |
| 6,262,555 | B1 | * | 7/2001 | Hammond et al. | 318/759 |
| 6,417,644 | B2 | * | 7/2002 | Hammond et al. | 318/759 |
| 7,612,518 | B2 | * | 11/2009 | Iura et al. | 318/762 |

OTHER PUBLICATIONS

Raj Narayanan, et al., "Improvements to Voltage Sag Ride-Through Performance of AC Variable Speed Drives", AUPEC 99, Australasian Universities Power Engineering Conference, XP-002671315, Sep. 21, 1999, 7 pages.
Joachim Holtz, et al., "Controlled AC Drives with Ride-Through Capability at Power Interruption", Industry Applications Society Annual Meeting, XP010118698, Oct. 2, 1993, pp. 629-636.

(Continued)

*Primary Examiner* — Rita Leykin
(74) *Attorney, Agent, or Firm* — Oblon, Spivak, McClelland, Maier & Neustadt, L.L.P.

(57) ABSTRACT

The invention relates to a method of control implemented in a variable speed drive for controlling the deceleration of an electric motor (M) in the case of electrical power outage. The method of control comprises:
 a step of determining the Joule-effect losses to be applied to the electric motor (M) and to the variable speed drive according to a deceleration ramp to be applied to the electric motor (M) during an electrical power outage,
 a step of determining the flux reference ($\phi_{ref}$) as a function of the said Joule-effect losses to be applied to the electric motor (M) and to the variable speed drive.

8 Claims, 3 Drawing Sheets

(56) References Cited

OTHER PUBLICATIONS

Gerd Terorde, et al., "Drive DC Bus Voltage Control during Power Interruptions using Kinetic Energy Recovery", Harmonics and Quality of Power, 2003, $10^{th}$ International Conference, XP010650833, Oct. 6, 2003, pp. 243-247.

French Preliminary Search Report and Written Opinion issued Mar. 13, 2012, in French 1156347, filed Jul. 12, 2011 (with English Translation of Categories of Cited Documents).

* cited by examiner

METHOD OF CONTROL IMPLEMENTED IN A VARIABLE SPEED DRIVE FOR CONTROLLING THE DECELERATION OF AN ELECTRIC MOTOR IN THE CASE OF POWER OUTAGE

TECHNICAL FIELD OF THE INVENTION

The present invention pertains to a method of control implemented in a variable speed drive for controlling the deceleration of an electric motor in the case of electrical power outage. The invention also relates to a control system able to implement the said method of control.

PRIOR ART

U.S. Pat. No. 4,678,980 describes a procedure employed in a variable speed drive for managing the deceleration of an electric motor when a power outage occurs. The procedure consists in selecting a particular frequency profile when a power outage is detected with a view to following a determined deceleration profile, stored in the variable speed drive, this particular frequency profile being different from the frequency profile employed during normal operation. In this document, the deceleration profile being pre-stored in the variable speed drive, it is therefore not always suitably adapted to the application in which the electric motor is employed.

The aim of the invention is to propose a control procedure in which it is possible to adapt the deceleration ramp to the application, so as to be able to stop the electric motor as quickly as is allowed by the mechanics of the machine using the electric motor.

DISCLOSURE OF THE INVENTION

This aim is achieved by a method of control implemented in a variable speed drive for controlling the deceleration of an electric motor in the case of electrical power outage. The variable speed drive comprises in particular a DC power supply bus to which is applied a voltage, the said DC power supply bus being connected to an inverter module and the said inverter module being connected to the electric motor and controlled according to a control law in which a control voltage to be applied to the electric motor is determined on the basis of a flux reference and of a speed reference. The method comprises:
- a step of determining the Joule-effect losses to be applied to the electric motor and to the variable speed drive according to a deceleration ramp to be applied to the electric motor during an electrical power outage,
- a step of determining the flux reference as a function of the said Joule-effect losses to be applied to the electric motor and to the variable speed drive.

According to a particular feature, the Joule-effect losses are determined by a comparison step performing a comparison between the voltage measured on the DC power supply bus of the variable speed drive and a reference value.

According to another particular feature, the reference value corresponds to the available energy required to follow the deceleration ramp for the electric motor.

According to another particular feature, the method comprises a step of activating or deactivating a limitation of the torque applied to the electric motor, executed according to the comparison performed during the comparison step.

The invention also relates to a variable speed drive intended to control the deceleration of an electric motor in the case of electrical power outage, the said variable speed drive comprising in particular a DC power supply bus to which is applied a voltage, the said DC power supply bus being connected to an inverter module, the said inverter module being connected to the electric motor and controlled according to a control law in which a control voltage to be applied to the electric motor is determined on the basis of a flux reference and of a speed reference. The variable speed drive comprises:
- means for determining the Joule-effect losses to be applied to the electric motor and to the variable speed drive according to a deceleration ramp to be applied to the electric motor during an electrical power outage,
- means for determining the flux reference as a function of the said Joule-effect losses to be applied to the electric motor and to the variable speed drive.

According to a particular feature, the variable speed drive comprises comparison means for comparing between the voltage measured on the DC power supply bus of the variable speed drive and a reference value with a view to deducing therefrom the Joule-effect losses to be applied to the electric motor.

According to another particular feature, the reference value corresponds to the available energy required to follow the deceleration ramp for the electric motor.

According to another particular feature, the variable speed drive comprises means for activating or deactivating a limitation of the torque applied to the electric motor, executed according to the comparison performed during the comparison step.

BRIEF DESCRIPTION OF THE FIGURES

Other characteristics and advantages will become apparent in the detailed description which follows given with regard to the appended drawings in which.

DETAILED DESCRIPTION OF AT LEAST ONE EMBODIMENT

The invention relates to a method of control implemented in a variable speed drive when a power outage is detected.

Figure 4:
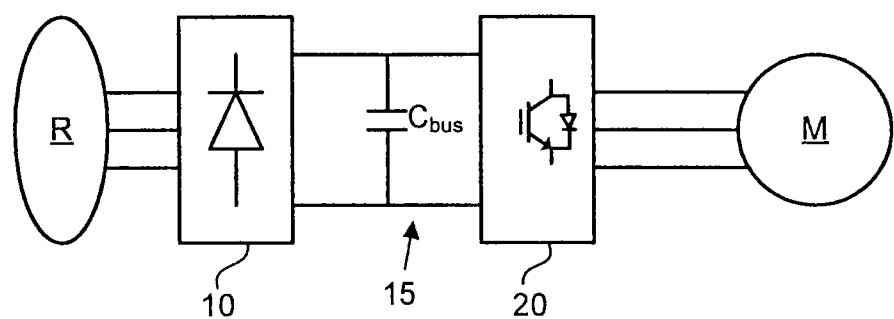
FIG. 4 represents, in a schematic manner, a variable speed drive connected to an electric motor.

As represented in FIG. 4, a variable speed drive intended to control an electric motor M is connected upstream, via several input phases, to an electrical network R and downstream, via several output phases, to the electric motor M. The variable speed drive comprises:
- at input, a rectifier module 10 composed as a general rule of a diode bridge intended to rectify the AC voltage provided by the electrical network R,
- a DC power supply bus 15 to which is applied the voltage rectified by the rectifier module, the DC power supply bus being fitted with a bus capacitor $C_{bus}$ making it possible to maintain the voltage of the bus at a constant value,
- at output, an inverter module 20 intended to transform the voltage $V_{bus}$ of the DC power supply bus into a variable voltage to be applied to the electric motor. The inverter module comprises several switching arms each fitted with several power transistors, each controlled to open or to close so as to apply a variable voltage to the electric motor M.

Figure 1:
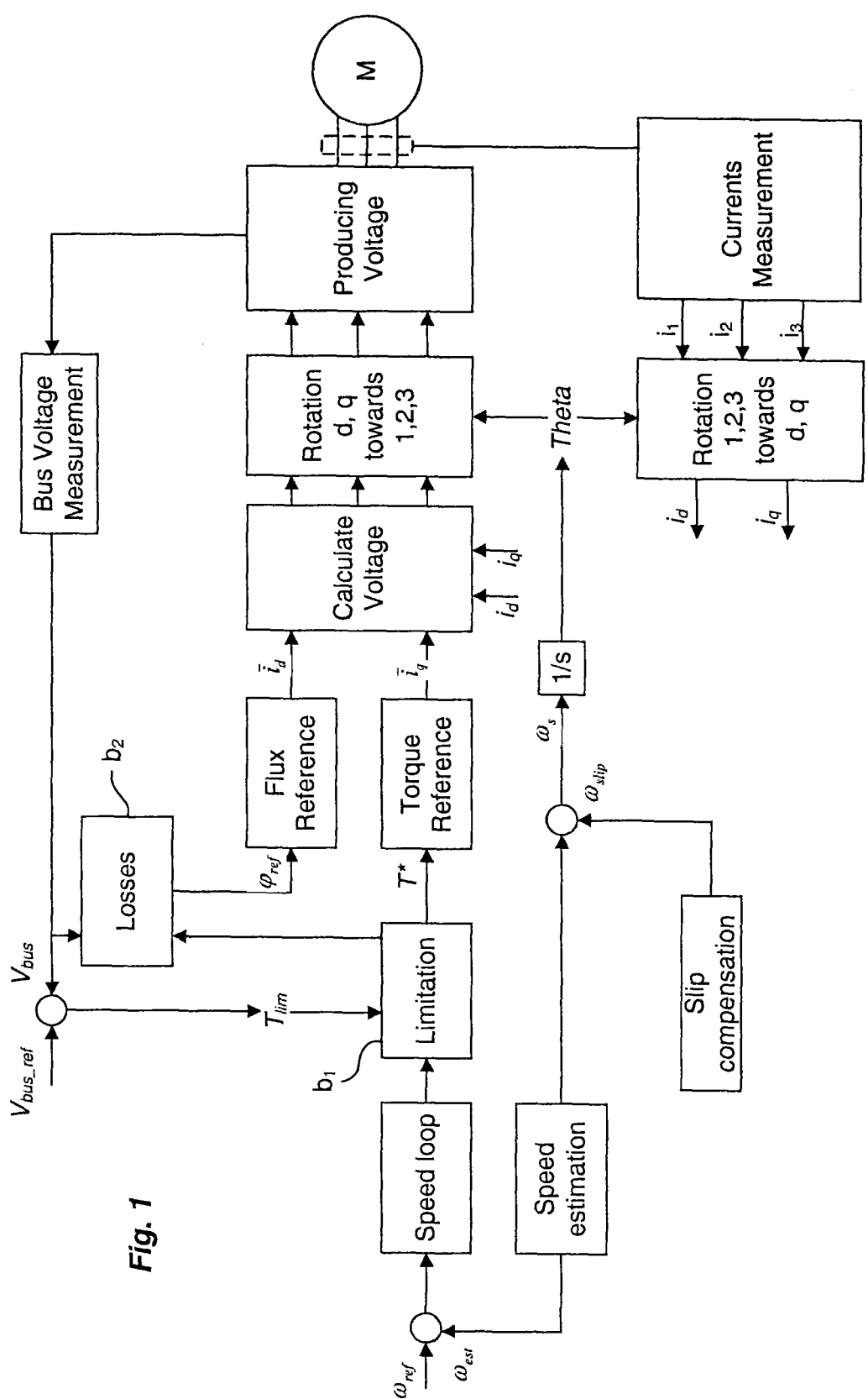
FIG. 1 represents a control scheme employed in a variable speed drive for the implementation of the method of control of the invention.

In a known manner, the power transistors are controlled by a control unit executing a determined control law in which a control voltage to be applied to the electric motor is determined as a function of a speed reference $\omega_{ref}$ (also designated frequency reference) and of a flux reference $\phi_{ref}$ (FIG. 1). The control law can also integrate a control block $b_1$ making it possible to limit the torque applied to the motor M as a function of the voltage $V_{bus}$ of the DC power supply bus. When the voltage $V_{bus}$ of the DC power supply bus goes below a reference value $V_{bus\_ref}$, the inverter module 20 is controlled in terms of torque limitation so as to regulate the voltage $V_{bus}$ of the DC power supply bus.

The principle of the invention is to adapt this control law to the management of the deceleration ramp for the electric motor M in the case of electrical power outage, that is to say when the variable speed drive detects that an operating voltage passes beneath a determined threshold value. The operating voltage may be a voltage measured on the input phases, or the voltage of the DC power supply bus.

According to the invention, the control law integrates a control block $b_2$ for the Joule-effect losses undergone by the electric motor and the variable speed drive (hereinafter designated losses). The method of control of the invention therefore consists in managing the losses so as to optimize the energy available in the variable speed drive after the power outage with a view to regulating the voltage $V_{bus}$ of the DC power supply bus to a reference value $K_{bus\_ref}$ adapted so as to comply with the deceleration ramp for the electric motor M. To manage the losses, the method of control of the invention consists in modifying the flux reference $\phi_{ref}$.

Since certain control blocks represented in FIG. 1 are well known in the prior art, they are not described in the present patent application.

The management of the deceleration time of the electric motor M, and therefore of its deceleration ramp with respect to the losses is explained by the demonstration hereinbelow.

The energy accumulated at the level of the voltage $V_{bus}$ of the DC power supply bus of a variable speed drive controlling an induction motor can be written through the following relation:

$$\frac{d}{dt}(E_{Bus} + E_{Meca} + E_{Elec}) = -P_{Var} - P_{Meca} - P_{Mot} \quad (1)$$

In which:

$E_{Bus}$ corresponds to the energy accumulated in the DC power supply bus $E_{Bus} = \frac{1}{2} \cdot C_{Bus} \cdot V_{Bus}^2$ taking account of the voltage of the DC power supply bus $V_{Bus}$ and of the capacitance of the bus capacitor $C_{Bus}$, $E_{Meca}$ corresponds to the mechanical energy generated by the electric motor $$E_{Meca} = \frac{1}{2} \cdot J \cdot \left(\frac{\omega}{n_p}\right)^2$$

according to its mechanical speed $$\frac{\omega}{n_p}$$

(ratio of the speed in the electrical reference frame and of the number of pairs of poles $n_p$) and its inertia J, $E_{Elec}$ corresponds to the electrical energy accumulated by the electric motor, $P_{Var}$ corresponds to the Joule-effect losses undergone by the variable speed drive, $P_{Meca}$ corresponds to the mechanical losses undergone by the motor due to the mechanical load or friction effect, $P_{Mot}$ corresponds to the Joule-effect losses undergone by the motor due to the electrical effect.

Now, for applications which are highly inertial and which possess a mode of operation where the load is disconnected, we have:

$$E_{Meca} \gg E_{Bus}, E_{Elec}$$

and $$P_{Meca} \approx 0$$

When an electrical power outage occurs, it is necessary to preserve sufficient energy in the variable drive ($E_{Bus}$) to power the variable speed drive. It is therefore necessary to regulate the energy in the bus capacitor $C_{bus}$ (which is then no longer supplied by the network) to a value sufficient to control the deceleration of the electric motor.

By taking account of the "reduced" dynamics of the system, that is to say:

$$\frac{d}{dt}(E_{Bus} + E_{Meca}) = -P_{Var} - P_{Mot} \quad (2)$$

With $$E_{Meca} = \frac{1}{2} \cdot J \cdot \left(\frac{\omega}{n_p}\right)^2$$

we obtain:

$$\frac{d}{dt}(E_{Meca}) = C_{Mot} \cdot \left(\frac{\omega}{n_p}\right) \quad (3)$$

While with $E_{Bus} \approx$ cons relation (2) then becomes $$\frac{d}{dt}(E_{Meca}) = -P_{Var} - P_{Mot} \quad (4)$$

In which:

$C_{Mot}$ represents the torque applied by the motor and is equal to $$C_{Mot} = \frac{J}{n_p} \cdot \frac{d}{dt}\omega,$$

J represents the inertia of the motor, $\omega$ represents the speed of the electric motor expressed in the electrical reference frame, $n_p$ represents the number of pairs of poles.

From (3), it follows that for nominal losses, the deceleration time $t_{dec}$ is fixed by the variable speed drive/electric motor system and cannot be modified to address a specific need. We obtain:

$$E_{Meca}(t) = E_{Meca}(\text{Initial}) - (P_{Var} + P_{Mot}) \cdot t$$

$$\Rightarrow t_{dec} = \frac{E_{Meca}(\text{Initial})}{P_{Var} + P_{Mot}}$$

In which $t_{dec}$ corresponds to the deceleration time of the electric motor M. In order to increase the deceleration time of the electric motor M, it is therefore required to decrease the losses, and in order to reduce the deceleration time of the electric motor, it is therefore necessary to increase the losses.

As described previously, in order to manage the losses, it is necessary to act on the flux reference applied in the control law. This is explained by the following reasoning:

The losses are composed mainly of two terms, that is to say of the motor losses and of the variable drive losses. They may be rewritten in the form of two functions $F_d(i_d)$ and $F_q(i_q)$ dependent respectively on the flux current $i_d$ and on the torque current $i_q$. When a power outage is detected, as a first approximation, the function $F_q(i_q)$ is negligible compared with the function $F_d(i_d)$ since the deceleration torque is low. The function $F_d(i_d)$ is monotonic in $i_d$, that is to say the losses only increase as the flux current $i_d$ increases. A decrease in the flux current $i_d$ therefore makes it possible to decrease the losses. It follows from this that by acting on the flux reference $\phi_{ref}$, it is possible to control the losses undergone by the electric motor M and the variable speed drive.

Figure 2:
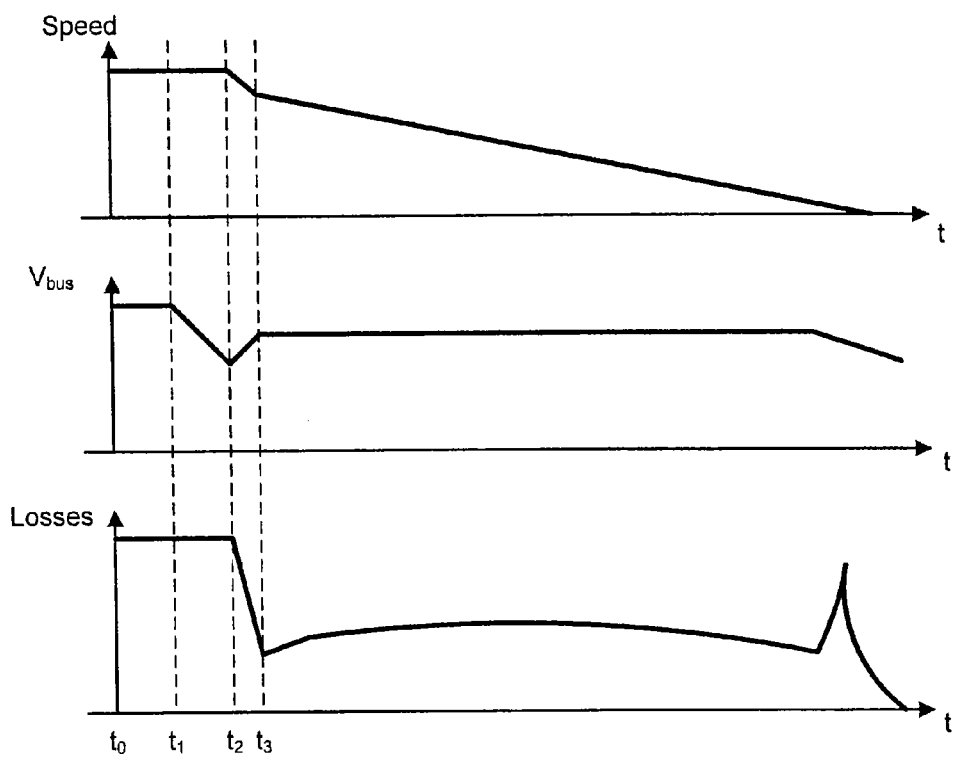
FIGS. 2 and 3 show timecharts illustrating the deceleration of an electric motor respectively during the application of the method of control of the invention and during the application of a standard procedure known in the prior art.

On the basis of the principles mentioned hereinabove, it is thus possible to propose a particular control scheme such as represented in FIG. 2. This control scheme comprises the following steps:

When an operating voltage falls below a determined threshold, synonymous with power outage, a deceleration ramp is applied to the electric motor M by the variable speed drive until a zero speed.

The losses are initialized to a low value, for example to a zero value, so as to limit the drop in the voltage.

The power outage gives rise to a dip in the voltage $V_{bus}$ of the DC power supply bus, activating its regulation by limitation of the torque applied to the electric motor M. Two cases can arise according to the deceleration ramp applied to the speed reference $\phi_{ref}$:

If the deceleration ramp is short, the voltage $V_{bus}$ of the DC power supply bus has a tendency to increase. It is then necessary
to increase the losses undergone by the motor M and the variable speed drive so as to follow the deceleration ramp,
or alternatively to slow the deceleration ramp.

If the deceleration ramp is long, the voltage $V_{bus}$ of the DC power supply bus has a tendency to drop. It is then necessary:
to decrease the losses undergone by the motor M and the variable speed drive so as to follow the deceleration ramp,
or alternatively to accelerate the deceleration ramp.

To address these two cases, it is necessary to regulate the voltage $V_{bus}$ of the DC power supply bus with respect to a bus voltage reference value $V_{bus\_ref}$. Regulation takes place as follows:

If the voltage $V_{bus}$ of the DC power supply bus is greater than the bus voltage reference value $V_{bus\_ref}$, the limitation of the torque decreases until it reaches a zero value. The motor torque is calculated so as to follow the deceleration ramp. If the deceleration ramp is short, there is a high inrush of torque. The latter is then limited to the limitation value, barring any increase in the losses. If the ramp is long, the voltage $V_{bus}$ of the DC power supply bus will dip naturally barring any decrease in the losses.

If the voltage $V_{bus}$ of the DC power supply bus is below the bus voltage reference value $V_{bus\_ref}$, the torque limitation rises to its nominal value. The motor torque is calculated so as to follow the deceleration ramp. If the deceleration ramp is short, there is a high inrush of torque. The voltage $V_{bus}$ of the DC power supply bus will increase naturally barring any increase in the losses. If the ramp is long, the torque can naturally re-increase up to the limitation so as to re-increase the voltage $V_{bus}$ of the DC power supply bus, barring any decrease in the losses.

According to the state of the torque limitation, the method of control of the invention controls the losses so as to regulate the voltage $V_{bus}$ of the DC power supply bus to the reference value $V_{bus\_ref}$ and thus adapt the deceleration ramp for the electric motor M. This takes place in the following manner:

If the torque limitation is active, the inverter module 20 is controlled so as to increase the losses in order to follow the deceleration ramp, If the torque limitation is inactive (the torque is then low and does not need to be limited), the inverter module 20 is controlled so as to decrease the losses in order to follow the deceleration ramp.

The flux reference $\phi_{ref}$ is thereafter adjusted in the direction of increasing or decreasing the losses to be applied to the electric motor M.

Figure 3:
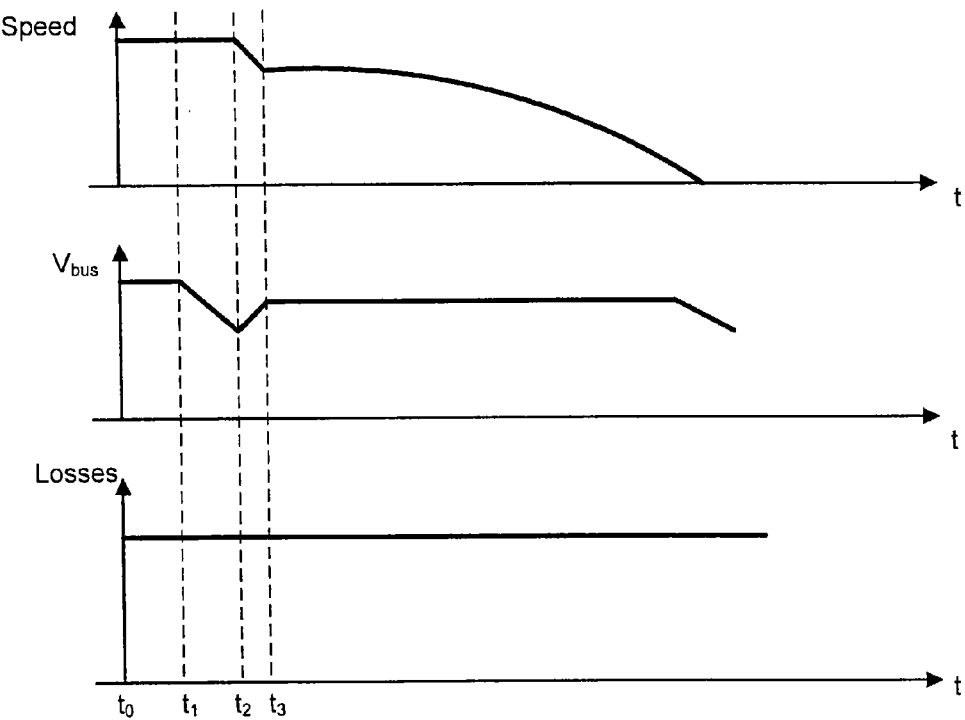

FIGS. 2 and 3 show timecharts illustrating the deceleration of an electric motor respectively when the method of control of the invention is employed in the variable speed drive or when a standard procedure known in the prior art is employed in the variable speed drive.

In these figures, the timecharts each show the speed curve for the electric motor M, the variation of the voltage of the DC power supply bus $V_{bus}$ and the variation of the losses.

In FIG. 2, for the method of control of the invention, the sequence is as follows:

Between $t_0$ and $t_1$, the electric motor rotates at a constant speed, the voltage $V_{bus}$ of the DC power supply bus is constant and the losses are also constant.

At $t_1$, a power outage occurs.

Between $t_1$ and $t_2$, the speed of the electric motor M remains constant but the voltage $V_{bus}$ of the DC power supply bus decreases down to a value below the bus voltage reference value $V_{bus\_ref}$. The losses remain constant.

At $t_2$, the variable speed drive detects the power outage.

Between $t_2$ and $t_3$, the deceleration of the electric motor M brings about an increase in the voltage $V_{bus}$ of the DC power supply bus. According to the value of the voltage $V_{bus}$ of the DC power supply bus with respect to the reference value $V_{bus\_ref}$, the method of control consists in managing the losses applied to the electric motor with a view to optimizing the available energy so as to follow the deceleration ramp for the electric motor. The management of the losses is carried out by adjusting the reference flux.

From $t_3$ onwards, the voltage of the DC power supply bus is regulated to the reference value making it possible to follow the deceleration ramp for the electric motor.

In FIG. 3, the deceleration of the electric motor is carried out in the absence of the losses control block $b_2$. The losses therefore remain permanently constant, whatever the value of the voltage $V_{bus}$ of the DC power supply bus. The deceleration ramp followed by the motor therefore cannot comply with the mechanics of the machine.

The invention claimed is:

1. Method of control implemented in a variable speed drive for controlling deceleration of an electric motor in the case of electrical power outage, the variable speed drive comprising a DC power supply bus to which is applied a voltage, the said DC power supply bus being connected to an inverter module, the said inverter module being connected to the electric motor and controlled according to a control law in which a control voltage to be applied to the electric motor is determined on the basis of a flux reference and of a speed reference, characterized in that the method of control comprises:
   a step of determining Joule-effect losses to be applied to the electric motor and to the variable speed drive according to a deceleration ramp to be applied to the electric motor during an electrical power outage,
   a step of determining the flux reference as a function of the Joule-effect losses to be applied to the electric motor and to the variable speed drive.

2. Method of control according to claim 1, characterized in that the Joule-effect losses are determined by a comparison step performing a comparison between the voltage measured on the DC power supply bus of the variable speed drive and a reference value.

3. Method of control according to claim 2, characterized in that the reference value corresponds to the available energy required to follow the deceleration ramp for the electric motor.

4. Method of control according to claim 2 or 3, characterized in that it comprises a step of activating or deactivating a limitation of torque applied to the electric motor, executed according to the comparison performed during the comparison step.

5. Variable speed drive intended to control deceleration of an electric motor in the case of electrical power outage, the variable speed drive comprising a DC power supply bus to which is applied a voltage, the said DC power supply bus being connected to an inverter module, the said inverter module being connected to the electric motor and controlled according to a control law in which a control voltage to be applied to the electric motor is determined on the basis of a flux reference and of a speed reference, characterized in that the variable speed drive comprises:
   means for determining Joule-effect losses to be applied to the electric motor and to the variable speed drive according to a deceleration ramp to be applied to the electric motor during an electrical power outage,
   means for determining the flux reference as a function of the Joule-effect losses to be applied to the electric motor and to the variable speed drive.

6. Variable speed drive according to claim 5, characterized in that it comprises comparison means for comparing between the voltage measured on the DC power supply bus of the variable speed drive and a reference value with a view to deducing therefrom the Joule-effect losses to be applied to the electric motor.

7. Variable speed drive according to claim 6, characterized in that the reference value corresponds to the available energy required to follow the deceleration ramp for the electric motor.

8. Variable speed drive according to claim 6 or 7, characterized in that it comprises means for activating or deactivating a limitation of the torque applied to the electric motor, executed according to the comparing performed by the comparison means.

* * * * *